United States Patent
Santos

(10) Patent No.: US 11,724,390 B2
(45) Date of Patent: Aug. 15, 2023

(54) SYSTEMS AND METHODS FOR AUTOMATED PRELOADING OF ACTUATORS

(71) Applicant: Samsung Electronics Company, Ltd., Suwon Si (KR)

(72) Inventor: Jose Marcel Cagampan Santos, Sunnyvale, CA (US)

(73) Assignee: Samsung Electronics Co., Ltd., Suwon Si (KR)

(*) Notice: Subject to any disclaimer, the term of this patent is extended or adjusted under 35 U.S.C. 154(b) by 191 days.

(21) Appl. No.: 17/216,338

(22) Filed: Mar. 29, 2021

(65) Prior Publication Data
US 2022/0305650 A1  Sep. 29, 2022

(51) Int. Cl.
  *B25J 9/16*  (2006.01)
  *B25J 9/10*  (2006.01)

(52) U.S. Cl.
  CPC .......... *B25J 9/1641* (2013.01); *B25J 9/103* (2013.01); *B25J 9/1653* (2013.01)

(58) Field of Classification Search
  CPC ........ B25J 9/1641; B25J 9/103; B25J 9/1653
  See application file for complete search history.

(56) References Cited

U.S. PATENT DOCUMENTS

| | | | |
|---|---|---|---|
| 5,994,844 A | 11/1999 | Crawford | |
| 6,442,451 B1 | 8/2002 | Lapham | |
| 8,676,381 B2 | 3/2014 | Kwon | |
| 9,533,411 B2 | 1/2017 | Jacobsen | |
| 10,246,152 B2 | 4/2019 | Takagi | |
| 10,661,398 B2 | 5/2020 | Isobe | |
| 10,765,537 B2 | 9/2020 | Smith | |
| 2007/0086755 A1 | 4/2007 | Dang | |
| 2010/0262289 A1 | 10/2010 | Hsu | |
| 2011/0022234 A1 | 1/2011 | Meyer | |
| 2013/0253419 A1 | 9/2013 | Favreau | |

(Continued)

FOREIGN PATENT DOCUMENTS

| | | |
|---|---|---|
| CN | 109921680 | 6/2019 |
| EP | 1705541 B1 | 7/2010 |

(Continued)

OTHER PUBLICATIONS

PCT Search Report in PCT/KR2022/003514, dated Jun. 16, 2022.

(Continued)

*Primary Examiner* — Abby Y Lin
*Assistant Examiner* — Dylan M Katz

(57) ABSTRACT

In one embodiment, a method includes accessing a target value for a gear system, where the target value includes a target backlash or a target preload, and where the gear system includes a driving gear, a driven gear, a preloading actuator coupled to the driving gear, and a preloading actuator controller, determining a measured value for the gear system, where the measured value includes a measured backlash or a measured preload, determining that an error value between the measured value and the target value exceeds a threshold error, and sending, by the preloading actuator controller, instructions to the preloading actuator to adjust the driving gear in response to determining the error value between the measured value and the target value exceeds the threshold error.

20 Claims, 9 Drawing Sheets

(56) References Cited

U.S. PATENT DOCUMENTS

| | | |
|---|---|---|
| 2014/0107841 A1 | 4/2014 | Danko |
| 2016/0016309 A1 | 1/2016 | Swift |
| 2017/0015004 A1 | 1/2017 | Osaka |
| 2017/0258549 A1* | 9/2017 | Tamura .................. A61B 90/20 |
| 2018/0318023 A1 | 11/2018 | Griffiths |
| 2019/0070762 A1 | 3/2019 | Altonen |
| 2019/0113904 A1* | 4/2019 | Iijima .................... G05B 19/19 |
| 2019/0203822 A1 | 7/2019 | Antonello |
| 2020/0001450 A1 | 1/2020 | Smith |
| 2020/0070346 A1 | 3/2020 | Oaki |
| 2020/0078947 A1 | 3/2020 | Wang |
| 2020/0086488 A1 | 3/2020 | Sato |
| 2020/0215692 A1 | 7/2020 | Pivac |
| 2020/0230818 A1 | 7/2020 | Lee |
| 2020/0262082 A1 | 8/2020 | Schoessler |
| 2021/0036690 A1 | 2/2021 | Tang |
| 2021/0114217 A1* | 4/2021 | Kikuchi ................ B25J 9/1674 |
| 2021/0316451 A1* | 10/2021 | Kumar .................... B25J 9/103 |
| 2022/0061934 A1* | 3/2022 | Sen ....................... A61B 34/30 |
| 2022/0088780 A1 | 3/2022 | Abdul-hadi |
| 2022/0126440 A1 | 4/2022 | Mizobe |
| 2022/0175472 A1 | 6/2022 | Brisson |
| 2022/0305646 A1 | 9/2022 | Jain |

FOREIGN PATENT DOCUMENTS

| | | |
|---|---|---|
| JP | H 11-063119 A | 3/1999 |
| JP | 3633760 | 3/2005 |
| JP | 2005284828 A | 10/2005 |
| JP | 2007-141189 A | 6/2007 |
| JP | 5758777 | 6/2015 |
| JP | 2016-035677 A | 3/2016 |
| KR | 20150109286 | 10/2015 |
| KR | 10-1640931 B1 | 7/2016 |
| KR | 10-2016-0139973 A | 12/2016 |
| KR | 102025100 | 9/2019 |
| KR | 10-2020-0064405 A | 6/2020 |
| KR | 1020200081407 | 7/2020 |
| WO | WO 2020-049152 | 3/2020 |

OTHER PUBLICATIONS

PCT Written Opinion in PCT/KR2022/003514, dated Jun. 16, 2022.
Non-final Office Action in U.S. Appl. No. 17/215,990, dated Dec. 5, 2022.
PCT Search Report in PCT/KR2022/004212, dated Jul. 4, 2022.
PCT Written Opinion in PCT/KR2022/004212, dated Jul. 4, 2022.
PCT Search Report in PCT/KR2022/005027, dated Jul. 26, 2022.
PCT Written Opinion in PCT/KR2022/005027, dated Jul. 26, 2022.
Yaskawa Smart Series Brochure, pp. 1-4, Mar. 2021.
Gealy, David V., Stephen McKinley, Brent Yi, Philipp Wu, Phillip R. Downey, Greg Balke, Allan Zhao et al. "Quasi-direct drive for low-cost compliant robotic manipulation." in 2019 International Conference on Robotics and Automation (ICRA), pp. 437-443. IEEE, 2019, Apr. 11, 2019.
AVID CNC Pro4848 CNC Assembly Instructions, Section 4: Rack and Pinion Drive pp. 189-242, May 2020.
Notice of Allowance in U.S. Appl. No. 17/215,990, dated Mar. 15, 2023.
Non-final Office Action in U.S. Appl. No. 17/229,724, dated Dec. 15, 2022.
Notice of Allowance in U.S. App. No. 17/229,724 dated Apr. 5, 2023.

* cited by examiner

SYSTEMS AND METHODS FOR AUTOMATED PRELOADING OF ACTUATORS

TECHNICAL FIELD

This disclosure relates generally to robotics, and in particular relates to controlling the loading of actuators.

BACKGROUND

A robot is a machine, especially one programmable by a computer, capable of carrying out a complex series of actions automatically. Robots may be guided by an external control device or the control may be embedded within. Robots may be constructed on the lines of human form, but most robots are machines designed to perform a task with no regard to their aesthetics. Robots may be autonomous or semi-autonomous and range from humanoids to industrial robots, medical operating robots, patient assist robots, dog therapy robots, collectively programmed swarm robots, UAV drones, and even microscopic nano robots. By mimicking a lifelike appearance or automating movements, a robot may convey a sense of intelligence or thought of its own.

The branch of technology that deals with the design, construction, operation, and application of robots, as well as computer systems for their control, sensory feedback, and information processing is robotics. These technologies deal with automated machines that can take the place of humans in dangerous environments or manufacturing processes, or resemble humans in appearance, behavior, or cognition.

Modern industrial robot arms may utilize expensive high-precision servo actuators, which may rely on a preload to achieve close-to-zero backlash. These systems achieve preload through expensive, high-precision components with tightly-tuned fits and tolerances.

DESCRIPTION OF EXAMPLE EMBODIMENTS

Robotic System Overview

Figure 1:
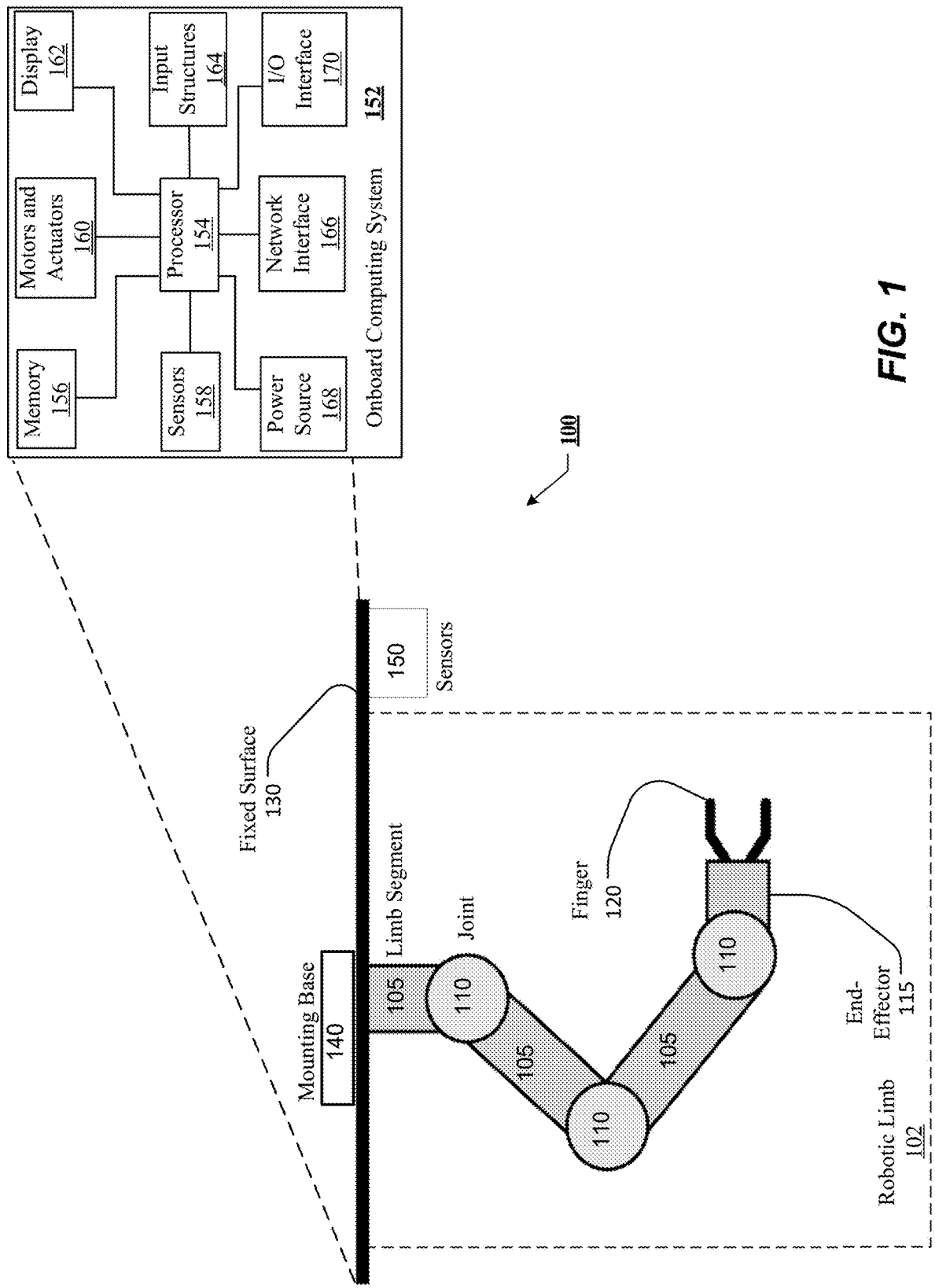
FIG. 1 illustrates an example robotic limb and apparatus.

This disclosure describes systems and methods that combine lightweight and low-cost components with captured sensor data from one or more sensors, such as image sensors, to increase the accuracy and precision of the robotic system through software. Image sensors are often affordable relative to robotic limb components and can be accurate for measuring distances and poses of objects within their respective fields of view.

In particular embodiments, a robotic system 100 may include a robotic limb that may perform operations to provide services to one or more users in different tasks such as cooking, gardening, painting, etc. Robotic limb 102 may include any suitable combination of one or more limb segment 105, joint 110, and end-effector 115. In particular embodiments, robotic limb 102 may further include one or more manipulators. As an example and not by way of limitation, this manipulator may include one or more fingers 120, a suction-based gripper, or a jammable-based gripper. In particular embodiments, robotic limb 102 may be connected at one end to a fixed surface 130 via mounting base 140, which may be a low-profile mounting base. In particular embodiments, robotic limb 100 may be associated with one or more external sensors 150. As an example and not by way of limitation, this fixed surface may include a wall, a ceiling, a cabinet, a workbench, etc. As further depicted by FIG. 1, the robotic system 100 may include an onboard computing system 152 that may be utilized for the operation of the robotic limb 102, in accordance with the presently disclosed embodiments. The onboard computing system may track multiple components of a robotic limb, such as joints, end-effectors, grippers, fingers, etc., and adjusts their pose accordingly until a desired pose is reached. A pose may include either of, or both of, the position in three-dimensional (3D) space and the orientation of the one or more components of the robotic limb. In particular embodiments, while the onboard computing system 152 is shown separate from the robotic limb, one or more components of the onboard computing system 152 may be located within the robotic limb 102. As an example and not by way of limitation, one or more motors and actuators 160 may be enclosed in the joint 110 section of the robotic limb 102. As another example and not by way of limitation, the power source 168 may be located within the mounting base 140. In particular embodiments, one or more components of the robotic system 100 may be included in another component of the robotic system 100. As an example and not by way of limitation, while sensors 150 is shown to be separate from the robotic limb, sensors 150 may be included in one or more components of the robotic limb 102.

For example, in particular embodiments, the onboard computing system 152 may include, among other things, one or more processor(s) 154, memory 156, sensors 158, one or more motors and actuators 160, a display 162, input structures 164, network interfaces 166, a power source 168, and an input/output (I/O) interface 170. It should be noted that FIG. 1 is merely one example of a particular implementation and is intended to illustrate the types of components that may be present in the robotic system 100. As depicted, the one or more processor(s) 154 may be operably coupled with the memory 156 to perform various algorithms for instructing the robotic limb 102 to perform different operations. Such programs or instructions executed by the processor(s) 154 may be stored in any suitable article of manufacture that includes one or more tangible, computer-readable media at least collectively storing the instructions or routines, such as the memory 156. The memory 156 may include any suitable articles of manufacture for storing data and executable instructions, such as random-access memory (RAM), read-only memory (ROM), rewritable flash memory, hard drives, and so forth. Also, programs (e.g., an operating system) encoded on such a computer program product may also include instructions that may be executed by the processor(s) 154 to enable the robotic limb 102 to perform various functionalities.

In certain embodiments, the sensors 158 may include, for example, one or more cameras (e.g., depth cameras), touch sensors, microphones, motion detection sensors, thermal detection sensors, light detection sensors, time of flight (ToF) sensors (e.g., LiDAR system), ultrasonic sensors, infrared sensors, or other similar sensors that may be utilized to detect various user inputs (e.g., user voice inputs, user gesture inputs, user touch inputs, user instrument inputs, user motion inputs, and so forth). The motors and actuators 160 may include any number of electronic motors (e.g., DC motors) that may be utilized to drive actuators, which may allow the robotic limb 102 to perform various mechanical operations and/or motional operations (e.g., walking, head and neck motions, limb and joint motions, body motions, dance motions, eye motions, and so forth). The display 162 may include any display architecture (e.g., LCD, OLED, e-Ink, and so forth), which may provide further means by which users may interact and engage with the robotic limb 102.

In certain embodiments, the input structures 164 may include any physical structures utilized to control one or more global functions of the robotic limb 102 (e.g., pressing a button to power "ON" or power "OFF" the robotic limb 102). The network interface 166 may include, for example, any number of network interfaces suitable for allowing the robotic limb 102 to access and receive data over one or more cloud-based networks (e.g., a cloud-based service that may service hundreds or thousands of the robotic limb 102 and the associated users corresponding thereto) and/or distributed networks. The power source 168 may include any suitable source of power, such as a rechargeable lithium polymer (Li-poly) battery and/or an alternating current (AC) power converter that may be utilized to power and/or charge the robotic limb 102 for operation. Similarly, the I/O interface 170 may be provided to allow the robotic limb 102 to interface with various other electronic or computing devices, such as one or more auxiliary electronic devices.

In particular embodiments, the onboard computing system 152 may instruct the robotic limb 102 to achieve a desired pose. The onboard computing system 152 may access sensor data representing a scene from one or more sensors. These sensors may comprise for example and not by way of limitation, one or more three-dimensional (3D) cameras, LIDAR, DVS, or RGB-D cameras. In particular embodiments, the sensor data may comprise image data (such as RGB-D or depth images). In particular embodiments, non-image based data (such as RFID data) may be used instead of, or in conjunction with, the image data. The sensor data may represent a scene that includes a least a portion of the robotic limb 102 that can thus be utilized by the computing device for various functions related to pose of the robotic limb 102. This disclosure contemplates that the one or more sensors can be located on the robotic limb 102 or external to the robotic limb 102, or both. Other sensors for sensing the pose of the robotic limb 102 may be built into the robotic system 100 of which the limb 102 is a part, and may include joint encoders, computation encoders, limit switches, motor current sensors, or any suitable combination thereof.

In particular embodiments, the onboard computing system 152 may isolate at least a portion of the sensor data that represents at least a portion of the robotic limb 102. As an example and not by way of limitation, this may be completed through a point cloud technique. In particular embodiments, the onboard computing system 152 may use 3D depth sensor data to record one or more snapshots of the point cloud of positional data points of the scene. These data points may include information about one or more external surfaces contained in the scene, including the external surfaces of the robotic limb 102, the table surface, and one or more objects contained in the scene. From this, the onboard computing system 152 may isolate a two-dimensional (2D) region that contains at least a portion of one or more objects contained within the scene. From at least a portion of the sensor data, the onboard computing system 152 may create one or more RGB-D clusters of various objects in the scene. In particular embodiments, the one or more RGB-D clusters of various objects includes the robotic limb 102 contained within the scene.

In particular embodiments, the scene may contain one or more objects that are further isolated by the onboard computing system 152. Upon isolating the one or more objects in the scene, the onboard computing system 152 may classify the one or more RGB-D clusters of various objects in the scene created from the portion of the sensor data. This classification may be conducted by the onboard computing system 152 via any method of classification, including for example and not by way of limitation manual identification by a user or any method of artificial intelligence, including computer vision, machine learning, neural networks, or deep learning. Variations of neural networks utilized for classification may include, for example and not by way of limitation, three-dimensional segmentation networks (3DSNs) such as three-dimensional convolutional neural networks (3DCNNs), Deep Kd-networks, regional convolutional neural networks (RCNNs), or recurrent neural networks (RNNs). In particular embodiments, this classification may determine that at least one of the one or more objects within a scene is a robotic limb 102. In particular embodiments, the onboard computing system 152 may additionally classify other objects contained within a scene, including for example but not by way of limitation, a coffee mug, a bottle, a vase, a spoon, a plate, a screwdriver, a light bulb, a hand or arm, etc.

While the present embodiments may be discussed below primarily with respect to a robotic limb, it should be appreciated that the present techniques may be applied to any of various robotic devices that may perform various operations to provide services to users. In particular embodiments, the robotic device may comprise any electronic device or computing device that may be configured with computer-based intelligence (e.g., machine learning [ML], artificial intelligence [AI], deep learning, cognitive computing, artificial neural networks [ANN], and so forth), which may be utilized by the robotic device to perform operations to provide services to users through, for example, motions, actions, gestures, body movements, facial expressions, limb and joint motions, display changes, lighting, sounds, and so forth. For example, in one embodiment, a robotic device may include a robot, a robotic limb, or similar AI or cognitive computing device that may be provided to contextually interact, instruct, operate, and engage with (e.g., in real-time or near real-time), for example, humans, pets, other robotic electronic devices, one or more servers, one or more cloud-based services, home appliances, electronic devices, automobiles, and so forth. Furthermore, as used herein, a robotic device may refer to any autonomous or semi-autonomous computing device capable of performing one or more mechanical and/or electromechanical motions or movements (e.g., human-like motions and movements) in response to, for example, one or more user inputs, one or more user commands (e.g., voice commands, gesture commands), one or more triggers (e.g., a time trigger, a keyword trigger, a tonal trigger, a user emotional response trigger, user motional trigger, a location trigger, an environmental trigger), and so forth.

Automated Preloading of Actuators

In particular embodiments, the disclosed technology includes a system for automated preloading of actuators. The automated preloading of actuators may be used in any suitable electro-mechanical system, including, for example, robotic systems. As an example and not by way of limitation, the automated preloading of actuators may be used for a gear system within a robotic system. The automated preloading of actuators may be used for other systems that include a gear system. Systems, such as a mechatronic system may rely on a preload to achieve close-to-zero backlash. In particular embodiments, the preload may be an internal force to a mechanism (e.g., a gear system) which causes a desired result. As an example and not by way of limitation, the preload may be an additional force in a system to cause a driving gear to be flush with a driven gear. In particular embodiments, backlash may be the effect of a result of a spacing between two different gears. The backlash may be caused by the spacing between two different gears. The backlash may be associated with an imprecision of the system and latency of the system. Typically, a mechatronic system may achieve preload by using expensive, high-precision components with tightly-tuned fits and tolerances. By having high-precision components, the components may be manufactured in such a way that all or almost all of the unnecessary excess space may be eliminated to reduce backlash to zero or close-to-zero. However, by including a form of adjustable preload, the cost of the system may be reduced by using less-expensive parts but still maintaining the required preload to achieve a desired result (e.g., a flush contact or beyond flush contact between two gears). Manual adjusting systems may achieve acceptable backlash levels but are difficult to make repeatable. As such, an automated preloading of actuators where a target preload and/or backlash is set for a gear system may implement an adjustable preload in a repeatable and efficient way that is comparable to a mechatronic system with high-precision components.

Certain technical challenges exist for addressing preload of a system. One technical challenge may be eventual wear of a system comprising high-precision components. A system, such as an industrial robot arm, may feature expensive high precision servo actuators that have preload to achieve close-to-zero backlash. These components may have tightly-tuned fits and tolerances. However, these systems will eventually wear down to a point where they exceed their rated service life. At that point these systems must be replaced with another system comprising expensive high-precision components. The solution presented by the embodiments disclosed herein to address this challenge may be an automated preloading of actuators. The automated preloading of actuators may achieve a target preload and/or reduce backlash to a comparable level to a system comprising high-precision components. As a system with automated preloading wears down with time, the system may automatically adjust the preload of the actuators of the system to counteract the wear of the components of the system. Another technical challenge may include a repeatability of manual preloading systems. While some systems may include a mechanism to manually adjust the preload of the system, these systems fail to adjust the preload in a repeatable way. The manual adjustment may open the system up to excessive wear of the mechanical components if a user adds too much preload to the system than is necessary. The solution presented by the embodiments disclosed herein to address this challenge may be again a system with automated preloading. The system may automatically determine a force to apply to the system to adjust the preload to achieve a target preload and/or target backlash. By having the system (e.g., a robotic system) handle the adjustment of preload, the system may adjust the preload of actuators in a repeatable way that is consistent.

Certain embodiments disclosed herein may provide one or more technical advantages. A technical advantage of the embodiments may include robustness to wear of a system. Another technical advantage of the embodiments may include a repeatable method of adjusting preload of a system. Certain embodiments disclosed herein may provide none, some, or all of the above technical advantages. One or more other technical advantages may be readily apparent to one skilled in the art in view of the figures, descriptions, and claims of the present disclosure.

In particular embodiments, a system may perform one or more functions as disclosed herein. The system may be one or more of a computing system, a robotic system, or any system including a gear system. In particular embodiments, the system may access a target value for a gear system. In particular embodiments, the target value may include a target backlash or a target preload. In particular embodiments, the gear system may include a driving gear, a driven gear, a preloading actuator coupled to the driving gear, and a preloading actuator controller. While this disclosure describes a gear system with a certain number of parts, this disclosure contemplates a gear system with any number and combinations of parts. As an example and not by way of limitation, the gear system may include two preloading actuators coupled to the driving gear and two respective preloading actuator controllers. As another example and not by way of limitation, a preloading actuator may be coupled to another preloading actuator and a single preloading actuator controller may control both actuators. In particular embodiments, the system may be associated with a model of a particular system (e.g., a robotic system), which may specify a target preload and/or target backlash of the gear system. The system may retrieve the target value from one or more databases. In particular embodiments, the target value may periodically be updated by another entity. As an example and not by way of limitation, if research done shows that a new value for a target preload may reduce the wear of a gear system, the target preload for a gear system may be updated. In particular embodiments, a target value may be pushed to the system. As an example and not by way of limitation, if a target value is updated, the target value may be sent to the system to update one or more gear systems. In particular embodiments, the system may periodically access a target value for a gear system. As an example and not by way of limitation, the system may be scheduled to automatically determine whether to adjust the preload. For instance, the system may determine whether to adjust the preload during downtimes where the system is not operating. While this disclosure describes a system accessing a target value for a gear system, this disclosure contemplates a system may access target values for several gear systems. As an example and not by way of limitation, for a system comprising multiple gear systems, the system may access target values for each of the systems to automatically adjust the preload for each of the gear systems as required. Although this disclosure describes accessing a target value for a gear system in a particular manner, this disclosure contemplates accessing a target value for a gear system in any suitable manner.

In particular embodiments, the system may determine a measured value for a gear system. In particular embodiments, the measured value for a gear system may include a measured backlash or a measured preload. In particular embodiments, the system may include one or more sensors coupled to components of the system. As an example and not by way of limitation, sensors may be coupled to the driving gear and to the driven gear. The sensors may collect data that may be used to calculate a measured value to measure the backlash or to measure the preload. For instance, rotary encoders may be coupled to axles of the driving gear and the driven gear and backlash may be measured as a difference or latency between movement of the driving gear and the expected movement of the driven gear based on the gear ratio. Other combinations of sensors and gear components may be used to measure backlash and to measure preload. Although this disclosure describes measuring a value for a gear system in a particular manner, this disclosure contemplates measuring a value for a gear system in any suitable manner.

In particular embodiments, the system may determine an error value between the measured value and the target value. In particular embodiments, the system may calculate the error value between the measured value and the target value. The system may determine whether the error value exceeds a threshold error. In particular embodiments, the threshold error may be set by a third-party. In particular embodiments, the system may access a threshold error from a database. Although this disclosure describes determining an error value between a measured value and a target value in a particular manner, this disclosure contemplates determining an error value between a measured value and a target value in any suitable manner.

In particular embodiments, the system may send instructions to a preloading actuator to adjust the driving gear. In particular embodiments, the system may send instructions to a preloading actuator to adjust a driving gear in response to determining the error value between the measured value and the target value exceeds the threshold error. The system may use a preloading actuator controller to send the instructions to the preloading actuator. In particular embodiments, the driving gear may be iteratively adjusted until an error value no longer exceeds a threshold error. The system may iteratively adjust, measure a value, determine an error, and determine whether the error exceeds the threshold error. In particular embodiments, the driving gear may be adjusted by a distance C. The distance C may be calculated based on a distance between a contact point of the driving gear and the driven gear multiplied by a factor as described herein. In particular embodiments, adjusting the driving gear with the preloading actuator is based on the error value between the measured value and the target value. As an example and not by way of limitation, the driving gear may be adjusted by a small amount (e.g., moved minimally) if the error value is small. In particular embodiments, adjusting the driving gear with the preloading actuator comprises shifting a position of the driving gear in relation to the driven gear to reduce the error value. As an example and not by way of limitation, the preloading actuator may cause the driving gear to move closer to the driven gear to reduce the error value. In particular embodiments, the system may send instructions using a preloading actuator controller to another preloading actuator to adjust the driving gear in response to determining the error value between the measured value and the target value exceeds the threshold error. As an example and not by way of limitation, two preloading actuators may be required to move a driving gear. The system may use a preloading actuator controller to send instructions to both of the preloading actuators to move the driving gear in a direction to reduce the error value. Although this disclosure describes sending instructions to a preloading actuator to adjust a driving gear in a particular manner, this disclosure contemplates sending instructions to a preloading actuator to adjust a driving gear in any suitable manner.

Figure 2B:
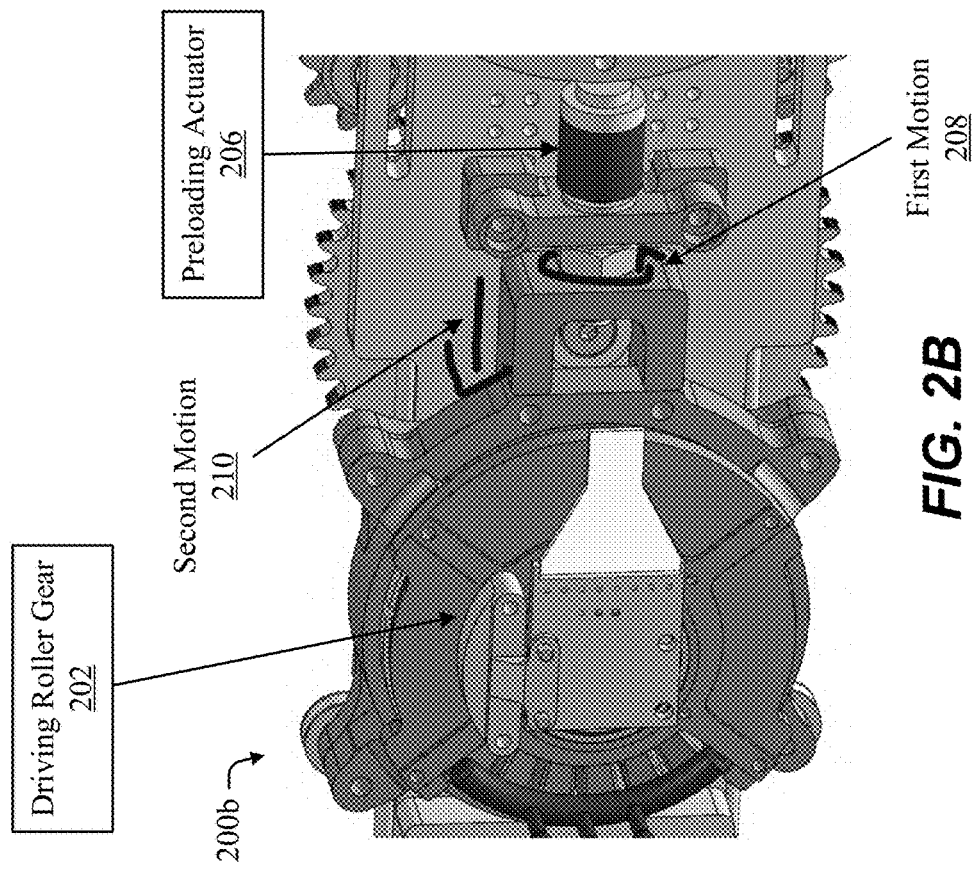
FIGS. 2A-2B illustrate different views of an example gear system.
Figure 2A:
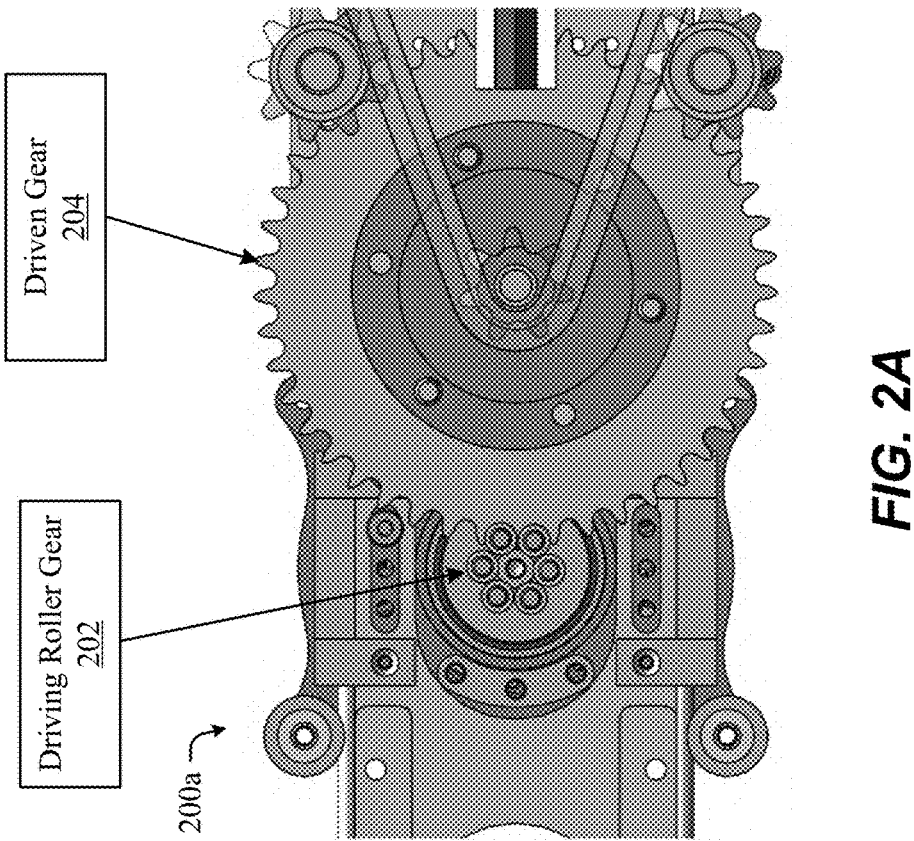

FIGS. 2A-2B illustrate different views of an example gear system 200. Referring to FIG. 2A, a front view 200a of a gear system 200 is shown. The gear system 200 may include a driving roller gear 202 that mates a driven gear 204. The teeth of the driving roller gear 202 may be in flush contact with the teeth of the driven gear 204. More specifically, the teeth of the driving roller gear 202 may fit into the grooves of the teeth of the driven gear 204. As a motor rotates the driving roller gear 202, the driven gear 204 may rotate a corresponding amount based on a gear ratio between the driving roller gear 202 and the driven gear 204. In particular embodiments, the driving roller gear 202 may be a main actuator. Referring to FIG. 2B, a back view 200b of a gear system 200 is shown. The back of the driving roller gear 202 may be coupled to a preloading actuator 206. In particular embodiments, a preloading actuator controller may send signals to the preloading actuator 206 instructing the preloading actuator 206 to move the driving roller gear 202 in a direction. As an example and not by way of limitation, the preloading actuator 206 may cause a first motion 208 which may be a rotational motion that causes the driving roller gear 202 to move in a direction following a second motion 210. While FIG. 2B shows the preloading actuator 206 adjusting the driving roller gear 202 in a first direction using the first motion 208 and the second motion 210, the preloading actuator 206 may adjust the driving roller gear 202 in an opposite direction.

Figure 3:
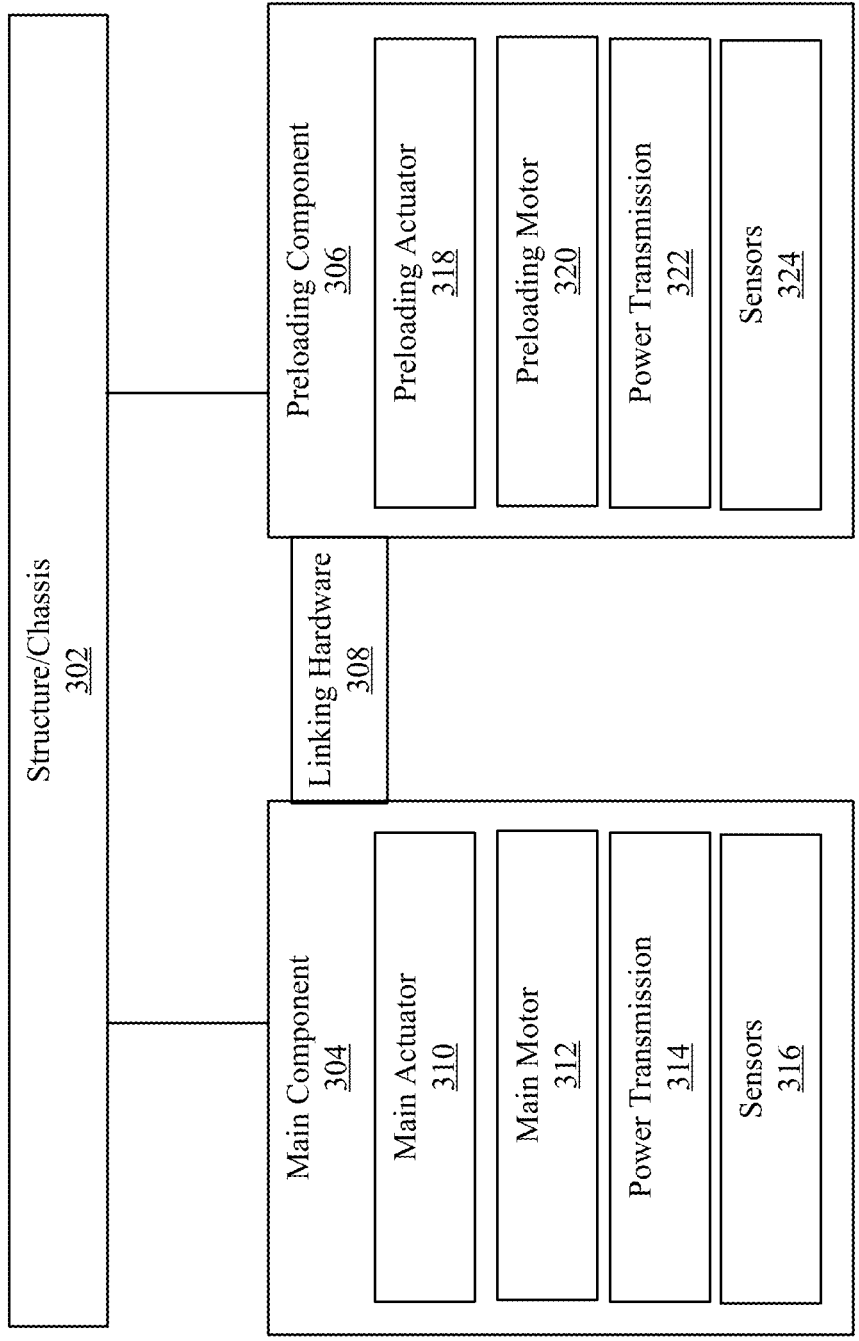
FIG. 3 illustrates an example gear system.

FIG. 3 illustrates an example gear system 300. The gear system 300 may perform automated preloading. In particular embodiments, the gear system 300 may include a structure/chassis 302, a main component 304, and a preloading component 306 linked to the main component 304 via linking hardware 308. In particular embodiments, the main component 304, preloading component 306, and the linking hardware 308 may be housed by the structure/chassis 302. In particular embodiments, the main component 304 may include a main actuator 310, a main motor 312, a power transmission 314, and sensors 316. In particular embodiments, the preloading component 306 may include a preloading actuator 318, a preloading motor 320, a power transmission 322, and sensors 324. Although the gear system 300 is shown comprising a certain number of components in a particular arrangement, the gear system 300 may include any number of components in any suitable arrangement. As an example and not by way of limitation, the gear system may include a main component 304 and two preloading components coupled to the main component via two separate linking hardware 308. Similarly, the main component 304 and the preloading component 306 may have any number of components in any suitable arrangement. In particular embodiments, a preloading actuator controller (not shown) may send a signal (e.g., a driving command) to the preloading actuator 318 to move the main component 304 and/or a component of the main component 304 (e.g., the main actuator 310). In particular embodiments, the main motor 312 and the preloading motor 320 may each be embodied as one or more of an electric motor (e.g., stepper, brushless, brushed, induction), a pneumatic motor, a hydraulic actuator, pneumatic piston, or any other suitable motor. In particular embodiments, the power transmission 314 and the power transmission 322 may each be embodied as one or more of spur gears, herringbone gears, roller gears, sprocket/chain, belt/pulley, linkages, or other suitable power transmission. In particular embodiments, sensors 316 and sensors 324 may each be embodied as one or more of an encoder, current sensor at the motor, strain gauge, external RGB camera, external DVS camera, external depth camera, or any other suitable sensor. In particular embodiments, the linking hardware 308 may be embodied as one or more of screws, pins, rivets, welds, gussets, bearings, couplers, or any other suitable linking hardware. In particular embodiments, the gear system 300 may be included in a system. As an example and not by way of limitation, the gear system 300 may be included in a robotic system 100. In particular embodiments, one or more components of the gear system 300 may be coupled to another component of a system. As an example and not by way of limitation, the main component 304 may be coupled to a driven gear. In particular embodiments, the preloading component 306 may move the main component 304 to adjust spacing between the main component 304 and the driven gear. As an example and not by way of limitation, the preloading component 306 may move the main component 304 in a direction to reduce spacing between the main component 304 and the driven gear.

Figure 4:
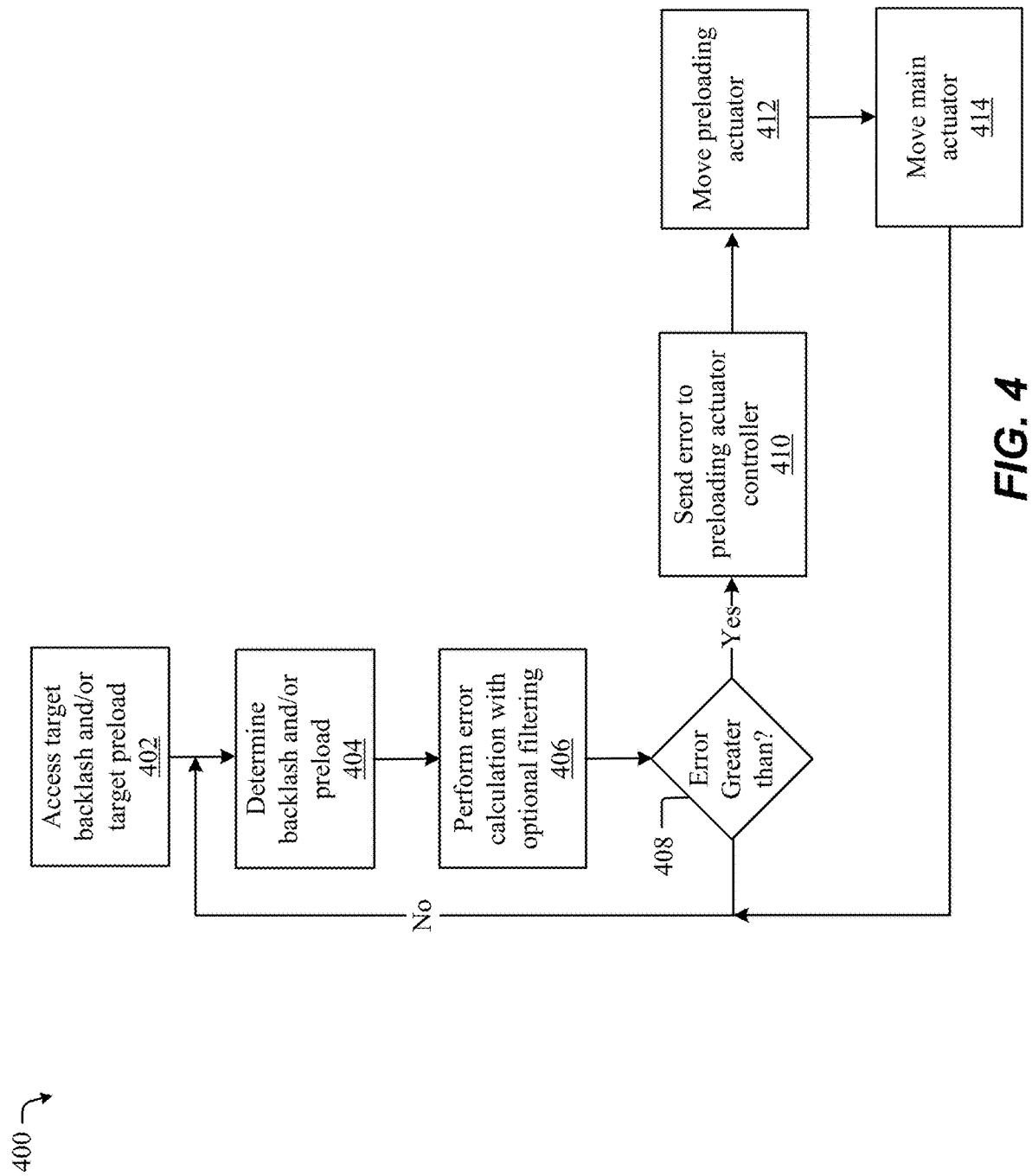
FIG. 4 illustrates a flow diagram of automated preloading of actuators.

FIG. 4 illustrates a flow diagram of a process 400 of automated preloading of actuators. In particular embodiments, a system may perform the process 400. As an example and not by way of limitation, a robotic system 100 may perform the process 400. In particular embodiments, the system may initiate process 400 at any suitable time. As an example and not by way of limitation, the system may initiate the process 400 during downtimes of the system (e.g., when the system is not operating or when the system is usually not operating). In particular embodiments, the system may periodically initiate the process 400. As an example and not by way of limitation, the system may initiate the process 400 every two months. In particular embodiments, the system may initiate the process 400 in response to detecting a disturbance of the system. As an example and not by way of limitation, the system may include one or more accelerometers and if a component of the system experiences a force that exceeds a threshold force, then the system may initiate the process 400 for one or more components that may be affected by the threshold force. In particular embodiments, the process 400 may start with step 402, where a system may access a target backlash and/or target preload for a gear system. As an example and not by way of limitation, the system may retrieve the target backlash and/or target preload from a data store. As another example and not by way of limitation, the target backlash and/or target preload may be preloaded into the device firmware of the system during manufacturing. At step 404, the system may determine a current backlash and/or preload of the gear system. At step 406, the system may perform an error calculation with optional filtering. The error calculation may be the difference between the current backlash/preload and the target backlash/preload. In particular embodiments, the optional filtering may be determining whether the calculated error exceeds a threshold error or not. At step 408, the system may determine whether an error has been detected and/or whether the error exceeds a threshold error specified by the optional filtering. In particular embodiments, the optional filtering may be adjusted. As an example and not by way of limitation, the threshold error may initially be 10% off target, but when the system determines to adjust a main actuator, then the threshold error may change to 5% off target. If an error is detected that exceeds a threshold error in step 408, then the process may proceed to step 410, where the system may send the error to a preloading actuator controller. In particular embodiments, the preloading actuator controller may be one or more of a PIDF, State Space, LQR. If no error is detected that exceeds a threshold error in step 408, then the process may return to step 404 to determine a current backlash and/or preload. In particular embodiments, the process 400 may end if no error is detected. At step 412, the system may move a preloading actuator. The system may use the preloading actuator controller to send a signal to the preloading actuator to move the preloading actuator. In particular embodiments, the preloading actuator controller may send a signal to move the preloading actuator based on the detected error. At step 414, the main actuator may move in response to the preloading actuator moving. As a result of the preloading actuator being coupled to the main actuator, movement in the preloading actuator may correspond to movement in the main actuator. After step 414, the process 400 may return to step 404 to determine an updated backlash and/or preload and whether the subsequent error is within a threshold error and/or eliminated. The process 400 may repeat iteratively until the error is reduced to below the threshold error and/or eliminated.

Figure 5:
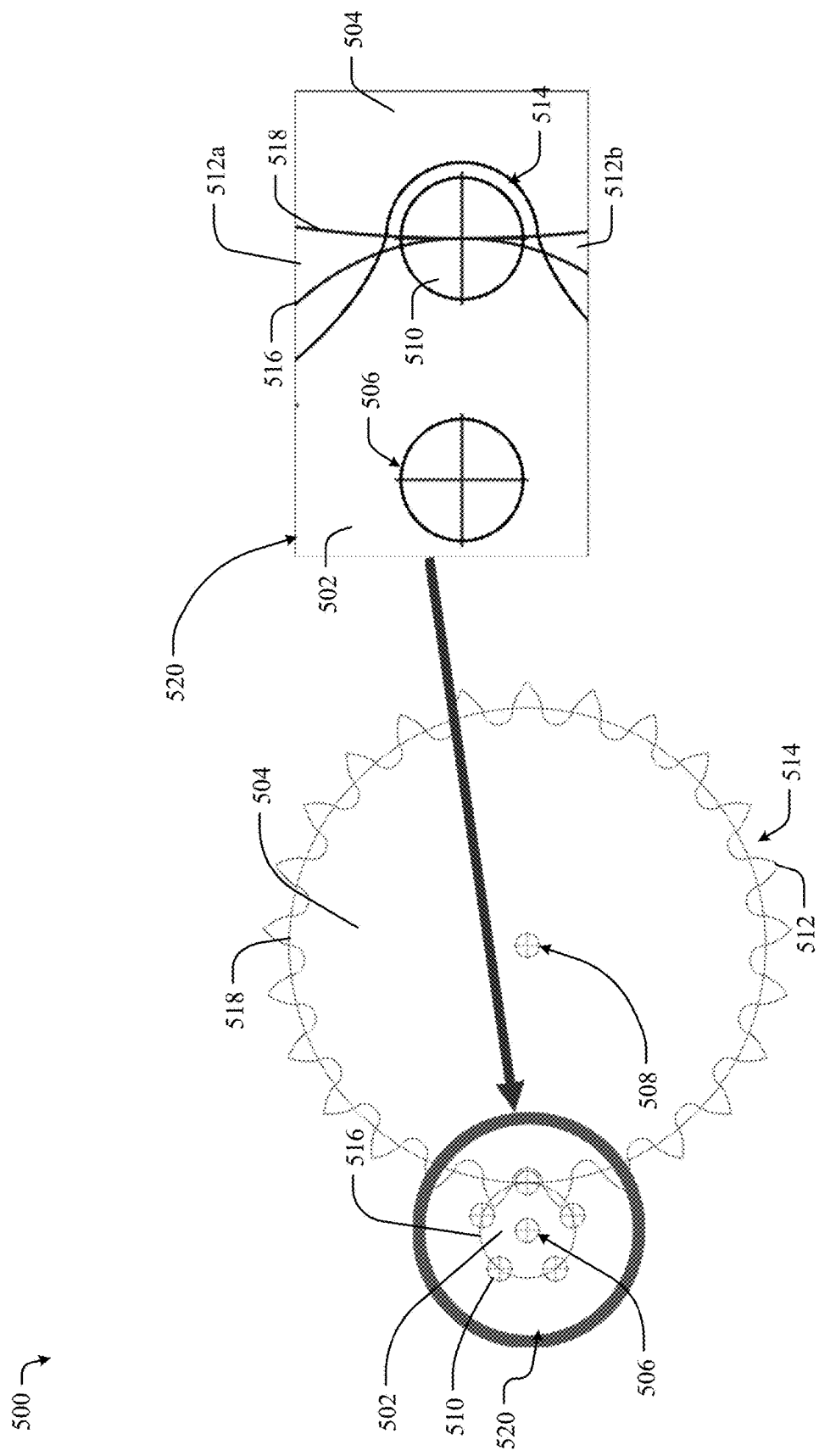
FIG. 5 illustrates an example contact between two gears.

FIG. 5 illustrates an example environment 500 including a driving gear 502 contacting a driven gear 504. In particular embodiments, an axle 506 of the driving gear 502 may be aligned with an axle 508 of the driven gear 504. The plane formed from the axle 506 and axle 508 may be parallel with the ground. In particular embodiments, the driving gear 502 may comprise a plurality of teeth 510 that fit in a groove 514 between the teeth 512 of the driven gear 504. In particular embodiments, a pitch circle 516 of the driving gear 502 may contact the pitch circle 518 of the driven gear 504. In particular embodiments, a focused view 520 may be expanded to look at the contact between the driving gear 502 and the driven gear 504. As shown in the focused view 520, the tooth 510 of the driving gear 502 may be in the groove 514 of the driven gear 504 between tooth 512a and tooth 512b.

Figure 6:
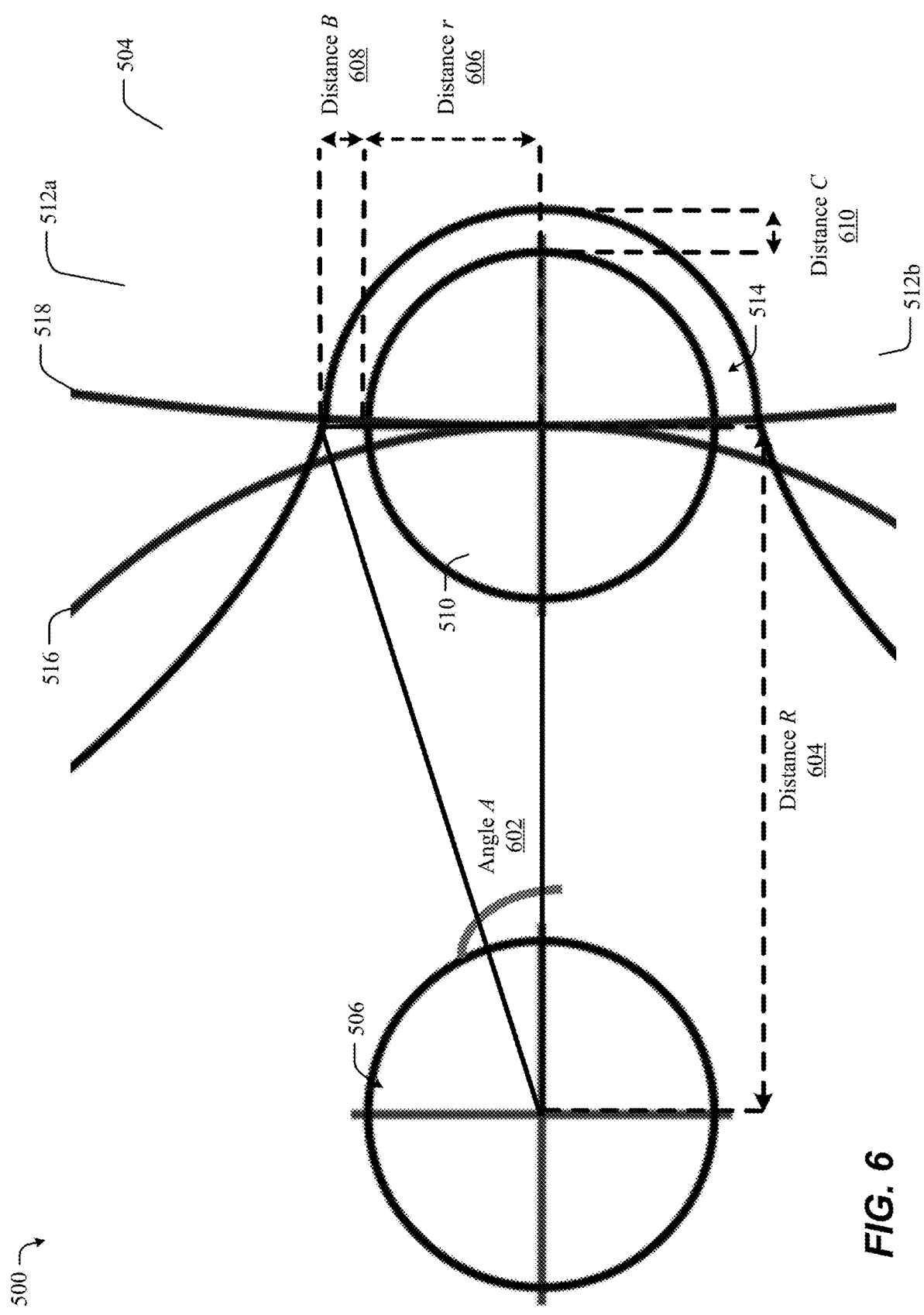
FIG. 6 illustrates a mathematical analysis of a contact between two gears.

FIG. 6 illustrates a mathematical analysis of the contact between a driving gear 502 and a driven gear 504 as shown in environment 500. In particular embodiments, a right triangle may be created using the distance between an axle 506 of the driving gear 502 to the center of the tooth 510 as illustrated by distance R for a first side of the right triangle. The distance R may be the radius of the pitch circle 516 of the driving gear 502. Another side of the right triangle may be the created by drawing a perpendicular line from the center of the tooth 510 of the driving gear 502 to the edge of the tooth 512 of the driven gear 504. The final side of the right triangle may be the hypotenuse connecting the two other sides. An angle A 602 may be measured from an encoder on both the axle 506 of the driving gear 502 and the axle 508 of the driven gear 504. Distance R 604 and distance r 606 may be based on the geometry of the driving gear 502. The distance B 608 may be measured using angle A 602, distance R 604, and distance r 606. In particular embodiments, distance C 610 may be equal to distance B 608 multiplied by a constant K. In particular embodiments, distance C 610 may be calculated using the equation $C=K*((R*\tan(A))-r)$. In particular embodiments, a system as described herein may use the distance C 610 to send to a preloading actuator controller. Distance C 610 may be equivalent to an error measured by the system as described in FIG. 4. A system may iteratively calculate the distance C 610 to reduce distance C 610 below a threshold value.

Figure 7:
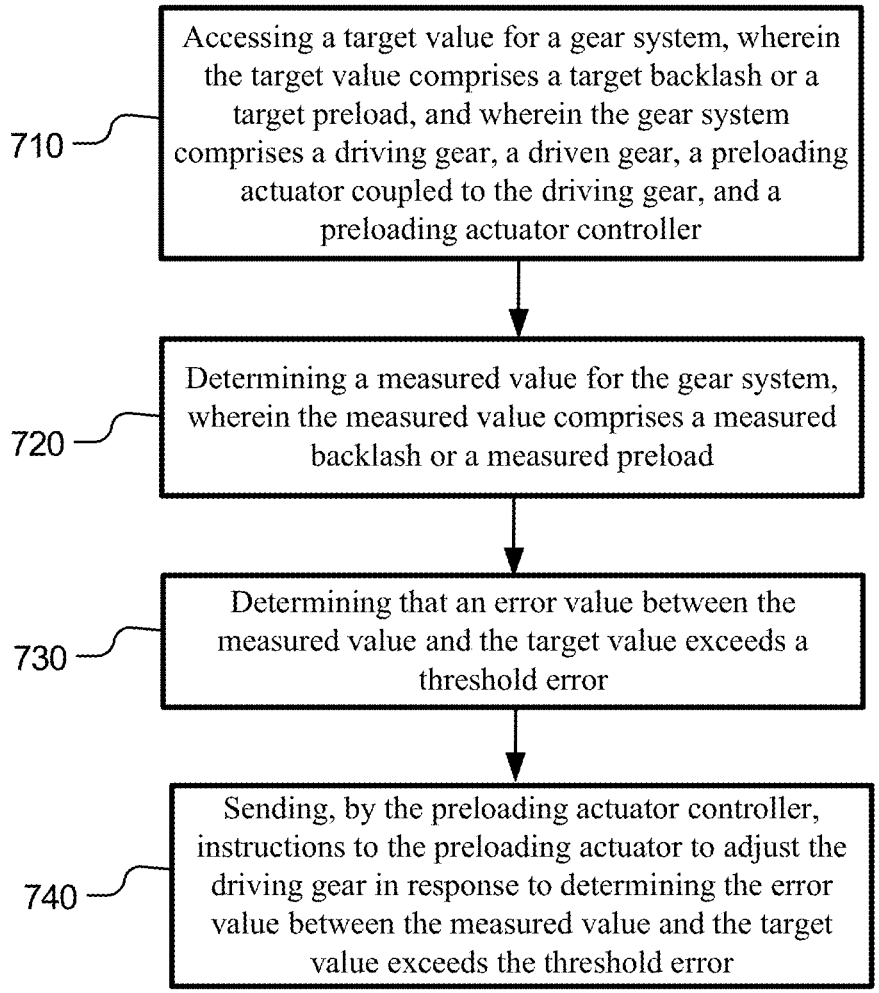
FIG. 7 illustrates an example method for automated preloading of actuators.

FIG. 7 illustrates is a flow diagram of a method for automated preloading of actuators, in accordance with the presently disclosed embodiments. The method 700 may be performed utilizing one or more processing devices (e.g., a robotic system 100) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing 2D and 3D image data, software (e.g., instructions running/executing on one or more processors), firmware (e.g., microcode), or some combination thereof.

The method 700 may begin at step 710 with the one or more processing devices (e.g., robotic system 100) accessing a target value for a gear system. For example, in particular embodiments, the target value comprises a target backlash or a target preload. In particular embodiments, the gear system comprises a driving gear, a driven gear, a preloading actuator coupled to the driving gear, and a preloading actuator controller. The method 700 may then continue at step 720 with the one or more processing devices (e.g., robotic system 100) determining a measured value for the gear system, wherein the measured value comprises a measured backlash or a measured preload. The method 700 may then continue at step 730 with the one or more processing devices (e.g., robotic system 100) determining that an error value between the measured value and the target value exceeds a threshold error. The method 700 may then continue at block 740 with the one or more processing devices (e.g., robotic system 100) sending, by the preloading actuator controller, instructions to the preloading actuator to adjust the driving gear in response to determining the error value between the measured value and the target value exceeds the threshold error. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for automated preloading of actuators including the particular steps of the method of FIG. 7, this disclosure contemplates any suitable method for automated preloading of actuators including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Systems and Methods

Figure 8:
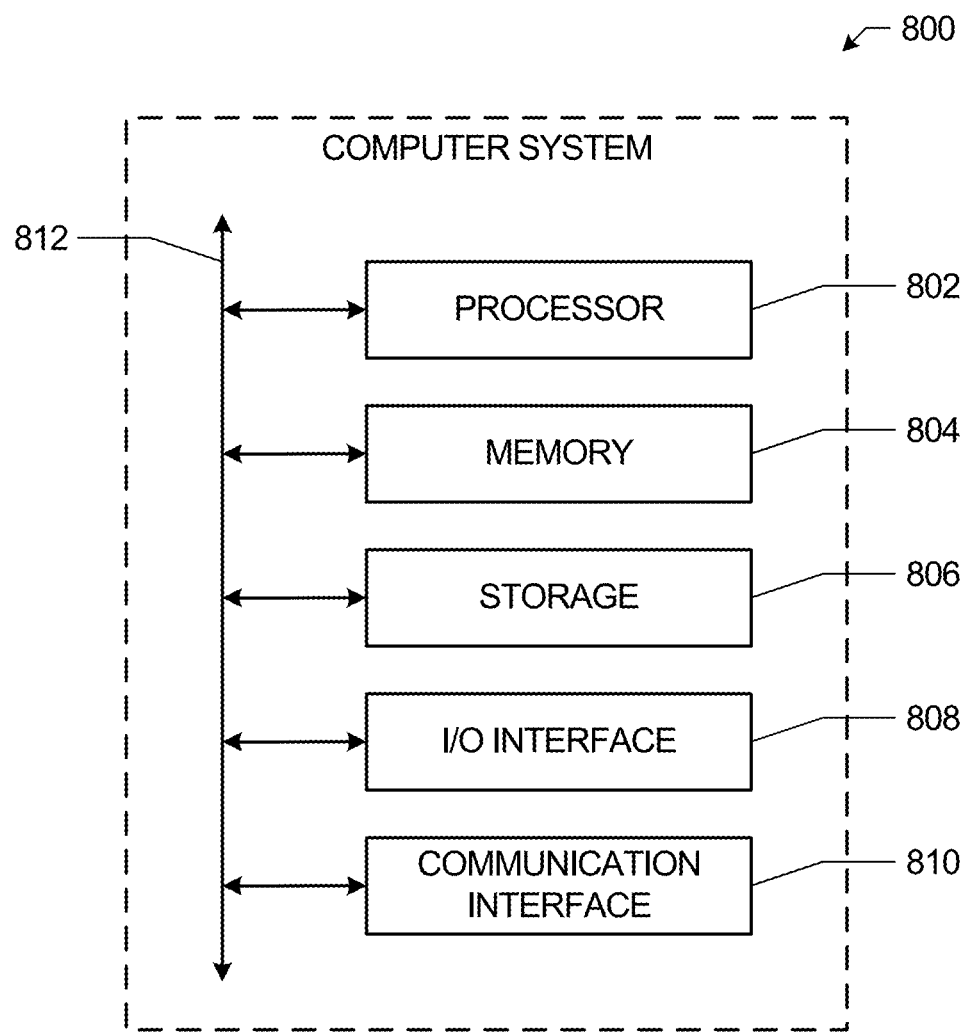
FIG. 8 illustrates an example computer system.

FIG. 8 illustrates an example computer system 800 that may be utilized to perform automated preloading of actuators, in accordance with the presently disclosed embodiments. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks.

Where appropriate, one or more computer systems 800 may perform without substantial spatial or temporal limitation one or more steps of one or more methods described or illustrated herein. As an example, and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement. In particular embodiments, processor 802 includes hardware for executing instructions, such as those making up a computer program. As an example, and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example, and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802.

Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example, and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere).

One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memory devices 804, where appropriate. Although this disclosure describes and illustrates particular memory, this disclosure contemplates any suitable memory.

In particular embodiments, storage 806 includes mass storage for data or instructions. As an example, and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 806 for them. Where appropriate, I/O interface 808 may include one or more device or software drivers enabling processor 802 to drive one or more of these I/O devices. I/O interface 808 may include one or more I/O interfaces 806, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it.

As an example, and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example, and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

AI Architecture

Figure 9:
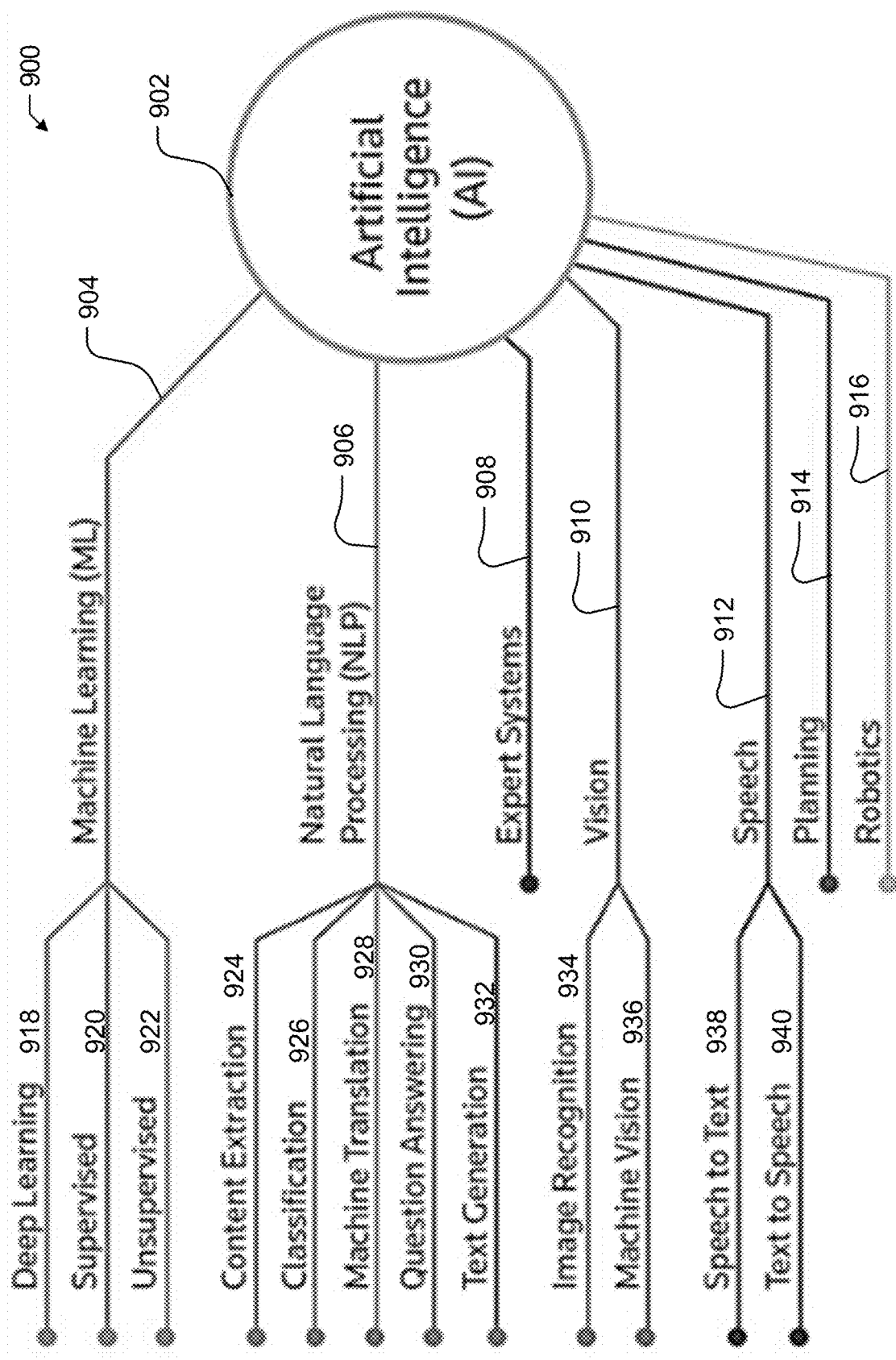
FIG. 9 illustrates a diagram of an example artificial intelligence (AI) architecture.

FIG. 9 illustrates a diagram 900 of an example artificial intelligence (AI) architecture 902 that may be utilized to perform automated preloading of actuators, in accordance with the presently disclosed embodiments. In particular embodiments, the AI architecture 902 may be implemented utilizing, for example, one or more processing devices that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), and/or other processing device(s) that may be suitable for processing various data and making one or more decisions based thereon), software (e.g., instructions running/executing on one or more processing devices), firmware (e.g., microcode), or some combination thereof.

In particular embodiments, as depicted by FIG. 9, the AI architecture 902 may include machine leaning (ML) algorithms and functions 904, natural language processing (NLP) algorithms and functions 906, expert systems 908, computer-based vision algorithms and functions 910, speech recognition algorithms and functions 912, planning algorithms and functions 914, and robotics algorithms and functions 916. In particular embodiments, the ML algorithms and functions 904 may include any statistics-based algorithms that may be suitable for finding patterns across large amounts of data (e.g., "Big Data" such as user click data or other user interactions, text data, image data, video data, audio data, speech data, numbers data, and so forth). For example, in particular embodiments, the ML algorithms and functions 904 may include deep learning algorithms 918, supervised learning algorithms 920, and unsupervised learning algorithms 922.

In particular embodiments, the deep learning algorithms 918 may include any artificial neural networks (ANNs) that may be utilized to learn deep levels of representations and abstractions from large amounts of data. For example, the deep learning algorithms 918 may include ANNs, such as a multilayer perceptron (MLP), an autoencoder (AE), a convolution neural network (CNN), a recurrent neural network (RNN), long short term memory (LSTM), a grated recurrent unit (GRU), a restricted Boltzmann Machine (RBM), a deep belief network (DBN), a bidirectional recurrent deep neural network (BRDNN), a generative adversarial network (GAN), and deep Q-networks, a neural autoregressive distribution estimation (NADE), an adversarial network (AN), attentional models (AM), deep reinforcement learning, and so forth.

In particular embodiments, the supervised learning algorithms 920 may include any algorithms that may be utilized to apply, for example, what has been learned in the past to new data using labeled examples for predicting future events. For example, starting from the analysis of a known training dataset, the supervised learning algorithms 920 may produce an inferred function to make predictions about the output values. The supervised learning algorithms 920 can also compare its output with the correct and intended output and find errors in order to modify the supervised learning algorithms 920 accordingly. On the other hand, the unsupervised learning algorithms 922 may include any algorithms that may applied, for example, when the data used to train the unsupervised learning algorithms 922 are neither classified or labeled. For example, the unsupervised learning algorithms 922 may study and analyze how systems may infer a function to describe a hidden structure from unlabeled data.

In particular embodiments, the NLP algorithms and functions 906 may include any algorithms or functions that may be suitable for automatically manipulating natural language, such as speech and/or text. For example, in particular embodiments, the NLP algorithms and functions 906 may include content extraction algorithms or functions 924, classification algorithms or functions 926, machine translation algorithms or functions 928, question answering (QA) algorithms or functions 930, and text generation algorithms or functions 932. In particular embodiments, the content extraction algorithms or functions 924 may include a means for extracting text or images from electronic documents (e.g., webpages, text editor documents, and so forth) to be utilized, for example, in other applications.

In particular embodiments, the classification algorithms or functions 926 may include any algorithms that may utilize a supervised learning model (e.g., logistic regression, naïve Bayes, stochastic gradient descent (SGD), k-nearest neighbors, decision trees, random forests, support vector machine (SVM), and so forth) to learn from the data input to the supervised learning model and to make new observations or classifications based thereon. The machine translation algorithms or functions 928 may include any algorithms or functions that may be suitable for automatically converting source text in one language, for example, into text in another language. The QA algorithms or functions 930 may include any algorithms or functions that may be suitable for automatically answering questions posed by humans in, for example, a natural language, such as that performed by voice-controlled personal assistant devices. The text generation algorithms or functions 932 may include any algorithms or functions that may be suitable for automatically generating natural language texts.

In particular embodiments, the expert systems 908 may include any algorithms or functions that may be suitable for simulating the judgment and behavior of a human or an organization that has expert knowledge and experience in a particular field (e.g., stock trading, medicine, sports statistics, and so forth). The computer-based vision algorithms and functions 910 may include any algorithms or functions that may be suitable for automatically extracting information from images (e.g., photo images, video images). For example, the computer-based vision algorithms and functions 910 may include image recognition algorithms 934 and machine vision algorithms 936. The image recognition algorithms 934 may include any algorithms that may be suitable for automatically identifying and/or classifying objects, places, people, and so forth that may be included in, for example, one or more image frames or other displayed data. The machine vision algorithms 936 may include any algorithms that may be suitable for allowing computers to "see", or, for example, to rely on image sensors cameras with specialized optics to acquire images for processing, analyzing, and/or measuring various data characteristics for decision making purposes.

In particular embodiments, the speech recognition algorithms and functions 912 may include any algorithms or functions that may be suitable for recognizing and translating spoken language into text, such as through automatic speech recognition (ASR), computer speech recognition, speech-to-text (STT), or text-to-speech (TTS) in order for the computing to communicate via speech with one or more users, for example. In particular embodiments, the planning algorithms and functions 938 may include any algorithms or functions that may be suitable for generating a sequence of actions, in which each action may include its own set of preconditions to be satisfied before performing the action. Examples of AI planning may include classical planning, reduction to other problems, temporal planning, probabilistic planning, preference-based planning, conditional planning, and so forth. Lastly, the robotics algorithms and functions 940 may include any algorithms, functions, or systems that may enable one or more devices to replicate human behavior through, for example, motions, gestures, performance tasks, decision-making, emotions, and so forth.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
    accessing a target value for a gear system, wherein the target value comprises a target backlash or a target preload, and wherein the gear system comprises a driving gear configured to rotate about an axis, a driven gear, a preloading actuator coupled to the driving gear, and a preloading actuator controller;
    determining a measured value for the gear system, wherein the measured value comprises a measured backlash or a measured preload;
    determining that an error value between the measured value and the target value exceeds a threshold error; and
    sending, by the preloading actuator controller, instructions to the preloading actuator to adjust the driving gear by translating the axis of the driving gear in response to determining the error value between the measured value and the target value exceeds the threshold error.

2. The method of claim 1, wherein the driving gear is adjusted by a distance C, wherein C is calculated based on a distance between a contact point of the driving gear and the driven gear multiplied by a factor.

3. The method of claim 1, wherein the driving gear is iteratively adjusted until the error value no longer exceeds the threshold error.

4. The method of claim 1, wherein adjusting the driving gear with the preloading actuator is based on the error value between the measured value and the target value.

5. The method of claim 1, wherein adjusting the driving gear with the preloading actuator comprises shifting a position of the driving gear in relation to the driven gear to reduce the error value.

6. The method of claim 1, wherein the gear system comprises an additional preloading actuator.

7. The method of claim 6, further comprising:
sending, by the preloading actuator controller, instructions to the additional preloading actuator to adjust the driving gear in response to determining the error value between the measured value and the target value exceeds the threshold error.

8. A robotic system comprising:
a computing system with control software;
a robot controller;
one or more robotic limbs;
one or more non-transitory computer-readable storage media including instructions; and
one or more processors coupled to the storage media, the one or more processors configured to execute the instructions to:
access a target value for a gear system, wherein the target value comprises a target backlash or a target preload, and wherein the gear system comprises a driving gear configured to rotate about an axis, a driven gear, a preloading actuator coupled to the driving gear, and a preloading actuator controller;
determine a measured value for the gear system, wherein the measured value comprises a measured backlash or a measured preload;
determine that an error value between the measured value and the target value exceeds a threshold error; and
send, by the preloading actuator controller, instructions to the preloading actuator to adjust the driving gear by translating the axis of the driving gear in response to determining the error value between the measured value and the target value exceeds the threshold error.

9. The robotic system of claim 8, wherein the driving gear is adjusted by a distance C, wherein C is calculated based on a distance between a contact point of the driving gear and the driven gear multiplied by a factor.

10. The robotic system of claim 8, wherein the driving gear is iteratively adjusted until the error value no longer exceeds the threshold error.

11. The robotic system of claim 8, wherein adjusting the driving gear with the preloading actuator is based on the error value between the measured value and the target value.

12. The robotic system of claim 8, wherein adjusting the driving gear with the preloading actuator comprises shifting a position of the driving gear in relation to the driven gear to reduce the error value.

13. The robotic system of claim 8, wherein the gear system comprises an additional preloading actuator.

14. The robotic system of claim 13, wherein the processors are further configured to execute the instructions to:
send, by the preloading actuator controller, instructions to the additional preloading actuator to adjust the driving gear in response to determining the error value between the measured value and the target value exceeds the threshold error.

15. A computer-readable non-transitory storage media comprising instructions executable by a processor of a robotic system to:
access a target value for a gear system, wherein the target value comprises a target backlash or a target preload, and wherein the gear system comprises a driving gear configured to rotate about an axis, a driven gear, a preloading actuator coupled to the driving gear, and a preloading actuator controller;
determine a measured value for the gear system, wherein the measured value comprises a measured backlash or a measured preload;
determine that an error value between the measured value and the target value exceeds a threshold error; and
send, by the preloading actuator controller, instructions to the preloading actuator to adjust the driving gear by translating the axis of the driving gear in response to determining the error value between the measured value and the target value exceeds the threshold error.

16. The media of claim 15, wherein the driving gear is adjusted by a distance C, wherein C is calculated based on a distance between a contact point of the driving gear and the driven gear multiplied by a factor.

17. The media of claim 15, wherein the driving gear is iteratively adjusted until the error value no longer exceeds the threshold error.

18. The media of claim 15, wherein adjusting the driving gear with the preloading actuator is based on the error value between the measured value and the target value.

19. The media of claim 15, wherein adjusting the driving gear with the preloading actuator comprises shifting a position of the driving gear in relation to the driven gear to reduce the error value.

20. The media of claim 15, wherein the gear system comprises an additional preloading actuator.

\* \* \* \* \*